United States Patent
Anand et al.

(10) Patent No.: US 7,893,830 B2
(45) Date of Patent: *Feb. 22, 2011

(54) SYSTEM AND METHOD OF DYNAMICALLY WEIGHTED ANALYSIS FOR INTRUSION DECISION-MAKING

(75) Inventors: Vaijayanthimala K. Anand, Austin, TX (US); Sandra K. Johnson, Austin, TX (US); David Robert Safford, Brewster, NY (US); Kimberly DaShawn Simon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/246,140

(22) Filed: Oct. 6, 2008

(65) Prior Publication Data

US 2009/0033490 A1 Feb. 5, 2009

Related U.S. Application Data

(63) Continuation of application No. 11/334,672, filed on Jan. 18, 2006, now Pat. No. 7,450,005.

(51) Int. Cl.
*G08B 13/00* (2006.01)

(52) U.S. Cl. ............ 340/541; 340/540; 340/521; 340/438; 340/439; 726/22; 726/23; 726/25

(58) Field of Classification Search ............ 340/541, 340/540, 521, 438, 439; 726/22, 23, 25
See application file for complete search history.

(56) References Cited

U.S. PATENT DOCUMENTS

| | | | |
|---|---|---|---|
| 6,321,338 B1 | 11/2001 | Porras et al. | |
| 6,462,657 B1 * | 10/2002 | Perski | 340/541 |
| 7,093,290 B2 * | 8/2006 | Han et al. | 726/22 |
| 7,305,708 B2 * | 12/2007 | Norton et al. | 726/23 |
| 2005/0268117 A1 | 12/2005 | Simon | |
| 2005/0278178 A1 | 12/2005 | Girouard et al. | |

OTHER PUBLICATIONS

"Intrusion Detection Methodologies Demystified", Enterasys Networks, Lit. # 9013198, Feb. 2003, pp. 1-23.
"Enterasys Dragon Host Sensor—Scalable, Flexible Host-Based Intrusion Defense", retrieved Sep. 22, 2005, pp. 1-2. http://www.enterasys.com/products/ids/DSHSS-xxx/.
"Spam Assassin", retrieved Sep. 22, 2005, Feb. 2005, pp. 1-2. http://wiki.apache.org/spamassassin/.
Abouzakhar et al., "Bayesian Networks Learning Approach to Cyber-crime Detect", retrieved Sep. 22, 2005, pp. 1-10. http://bayesia.com/GB/solutions/cyberCrime.php.

* cited by examiner

*Primary Examiner*—Tai T Nguyen
(74) *Attorney, Agent, or Firm*—Yee & Associates, P.C.; Matthew W. Baca

(57) ABSTRACT

An intrusion detection mechanism is provided for flexible, automatic, thorough, and consistent security checking and vulnerability resolution in a heterogeneous environment. The mechanism may provide a predefined number of default intrusion analysis approaches, such as signature-based, anomaly-based, scan-based, and danger theory. The intrusion detection mechanism also allows a limitless number of intrusion analysis approaches to be added on the fly. Using an intrusion detection skin, the mechanism allows various weights to be assigned to specific intrusion analysis approaches. The mechanism may adjust these weights dynamically. The score ration can be tailored to determine if an intrusion occurred and adjusted dynamically. Also, multiple security policies for any type of computing element may be enforced.

20 Claims, 4 Drawing Sheets

SYSTEM AND METHOD OF DYNAMICALLY WEIGHTED ANALYSIS FOR INTRUSION DECISION-MAKING

This application is a continuation of application Ser. No. 11/334,672, filed Jan. 18, 2006 which issued on Nov. 11, 2008 as U.S. Pat. No. 7,450,005.

BACKGROUND OF THE INVENTION

1. Field of the Invention

The present invention relates to data processing and, in particular, to a method, apparatus, and program for dynamically weighted analysis for intrusion decision making.

2. Description of the Related Art

Many companies develop or use products that utilize databases. These databases often store sensitive data, such as social security numbers, medical records, financial transactions, and the like. Consequently, database administrators are confronted with maintaining security for these databases. This responsibility may become unwieldy because multiple databases may be located on multiple servers and platforms. In addition, each platform may have a different method of checking database security. Also, security modules/policies constantly change as new vulnerabilities are discovered. New security policies call for new, improved, or updated security checks.

To keep up with changes to security modules and policies, companies must keep their database administrators highly trained, which results in a significant cost to the companies. Furthermore, there is a high risk of human error, because database administrators must keep track of so many databases, security policies, interfaces, etc. Database administrators also have to know and execute the correct security checking of many varying databases in a timely and efficient manner to prevent jeopardizing credibility of products and services.

Current solutions are implemented as scripts that run security checks on a database. However, the security checking is specific to a single database. Also, the scripts only run the checks and do not support resolution of security violations. Scripts also do not easily adapt to the rapidly changing requirements of differing security models/policies or database environments and administration interfaces.

Also, technology is moving toward autonomic computing systems that are self-configuring, self-optimizing, self-healing, and self-protecting with minimal human intervention. However, autonomic computing environments cannot be viable unless the systems are also self-securing. Adequate security must be ensured in an effective manner or autonomic computing will remain only a vision.

An autonomic computing environment may be comprised of several heterogeneously interconnected elements and, in turn, presents many challenges for ensuring sufficient security. One of these challenges involves determining effective criteria and methods for differentiating between normal system failures and those failures that are caused by malicious attacks. Due to such complex challenges, one must first solve how systems can effectively cope with intrusions.

Moreover, computing systems are susceptible to malicious attacks. Imagine a complex autonomic computing system that is linked to several hundreds of elements and unable to cope with a computer virus that corrupts key system functions. The virus could then corrupt vital system functions of the entire autonomic computing environment. Human intervention would result after the damage has completely penetrated the environment and, thus, resolutions would be very time consuming and costly.

Coping with intrusions is difficult in many ways. One important reason is that perspectives of both the victim and the attacker of an intrusion may be involved. Typically, for an intrusion to succeed the attacker has committed a malicious act that can be detected and the victim is subjected to some amount of loss. But when attacks occur that cannot be discovered, deciding what an intrusion is may become quite difficult.

SUMMARY OF THE INVENTION

The exemplary embodiments recognize the disadvantages of the prior art and provide an intrusion detection system for intrusion detection in a computer environment. An analysis module receives first configuration information from an intrusion detection skin. The first configuration information identifies a set of one or more analysis approaches to be executed and a weight to apply to each of the one or more analysis approaches. The analysis module executes the set of one or more analysis approaches against event information generated by one or more computing elements in a computer environment. A filtering mechanism determines a score based on one or more policies. A score interpreter determines whether the event information represents an intrusion based on the score.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
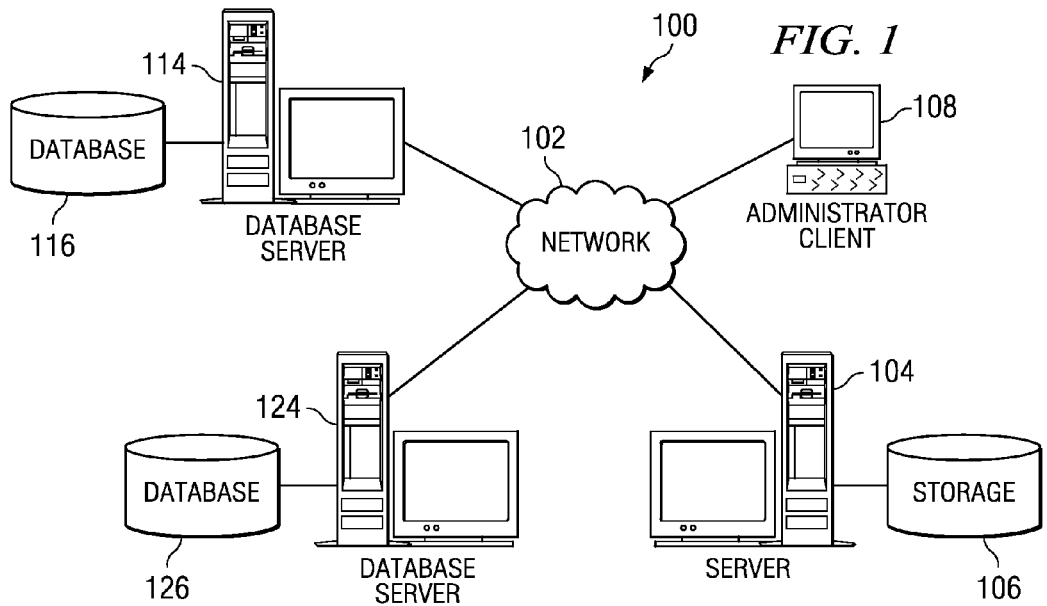
FIG. 1 depicts a pictorial representation of a network of data processing systems in which exemplary aspects of the present invention may be implemented.
Figure 2:
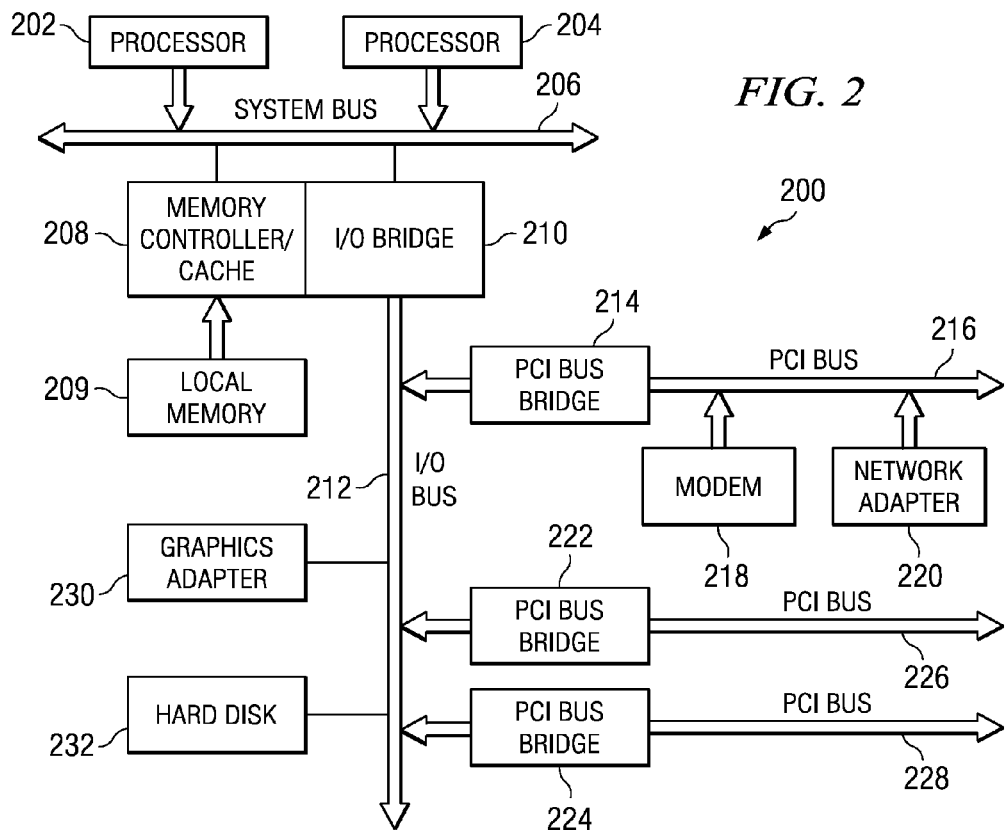
FIG. 2 is a block diagram of a data processing system that may be implemented as a server in accordance with exemplary aspects of the present invention.
Figure 3:
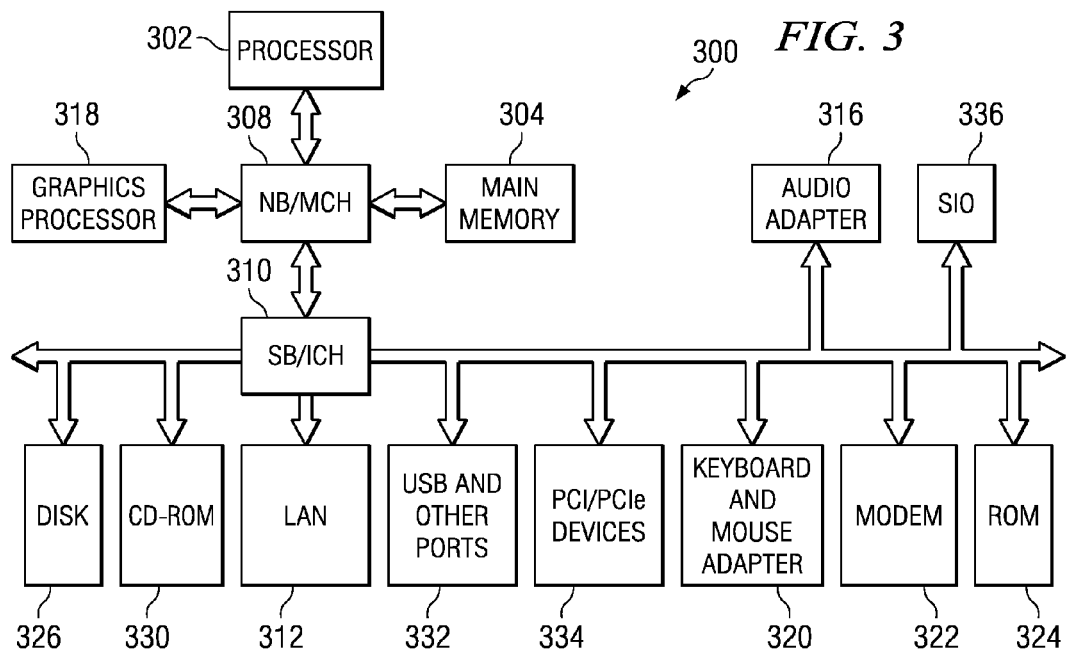
FIG. 3 is a block diagram of a data processing system in which exemplary aspects of the present invention may be implemented.

The present invention provides a method, apparatus, and computer program product for dynamically weighted analysis for intrusion decision making. The data processing device may be a stand-alone computing device or may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which exemplary aspects of the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 114, 124 are connected to network 102 and provide access to storage units 106, 116, 126. In addition, client 108 is connected to network 102. Client 108 may be, for example, a personal computer or network computer. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

More particularly, in the example shown in FIG. 1, servers 114, 124 are database servers and provide access to databases 116, 126, respectively. Client 108 is a database administrator workstation. In this case, the database administrator must manage the security of multiple databases, which may have different security policies and administration interfaces. Because of this complexity, security breaches on databases are more apt to occur. This may eventually place a company's reputation and credibility, as well as profitability, at risk.

Security models/policies constantly evolve as new security holes arise. This causes database administrators to scramble to apply new or updated security checks, which are usually executed manually, to cover the new requirements of the security policies. Also, there is typically a short period of time to apply these new requirements in order to protect databases from potential security breaches. Due to the urgency and complexity of this process, particularly with heterogeneous database environments, database administrators can easily fall short of ensuring the security of the databases, causing sensitive data to be at risk.

In accordance with exemplary aspects of the present invention, an intrusion detection mechanism is provided for flexible, automatic, thorough, and consistent security checking and vulnerability resolution in a heterogeneous environment. The mechanism may provide a predefined number of default intrusion analysis approaches, such as signature-based, anomaly-based, scan-based, and danger theory. The intrusion detection mechanism also allows a limitless number of intrusion analysis approaches to be added on the fly. Using an intrusion detection skin, the mechanism allows various weights to be assigned to specific intrusion analysis approaches. The mechanism may adjust these weights dynamically. The score ration can be tailored to determine if an intrusion occurred and adjusted dynamically. Also, multiple security policies for any type of computing element may be enforced.

In an exemplary embodiment, the security mechanism may be embodied on a server, such as server 104. Report data, error information, and the like may be stored in storage 106. A database administrator may configure the security mechanism locally or remotely using administrator client 108. The security mechanism may also be configured to send output to a display, to a report file, or to a remote device, such as administrator workstation 108. In an alternative embodiment, the security mechanism may be embodied on the administrator workstation itself.

Referring to FIG. 2, a block diagram of a data processing system that may be implemented as a server, such as server 104 in FIG. 1, is depicted in accordance with exemplary aspects of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM eServer™ pSeries® system, a product of International Business Machines Corporation in Armonk, N.Y., running the Advanced Interactive Executive (AIX) operating system or LINUX operating system. An object oriented programming system, such as a Java™ programming system, may run in conjunction with the operating system and provides calls to the operating system from Java programs or applications executing on data processing system 300. "JAVA" is a trademark of Sun Microsystems, Inc.

With reference now to FIG. 3, a block diagram of a data processing system is shown in which exemplary aspects of the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and peripheral component interconnect (PCI) or PCI express (PCIe) devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as the Windows XP™ operating system, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc. Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Figure 4:
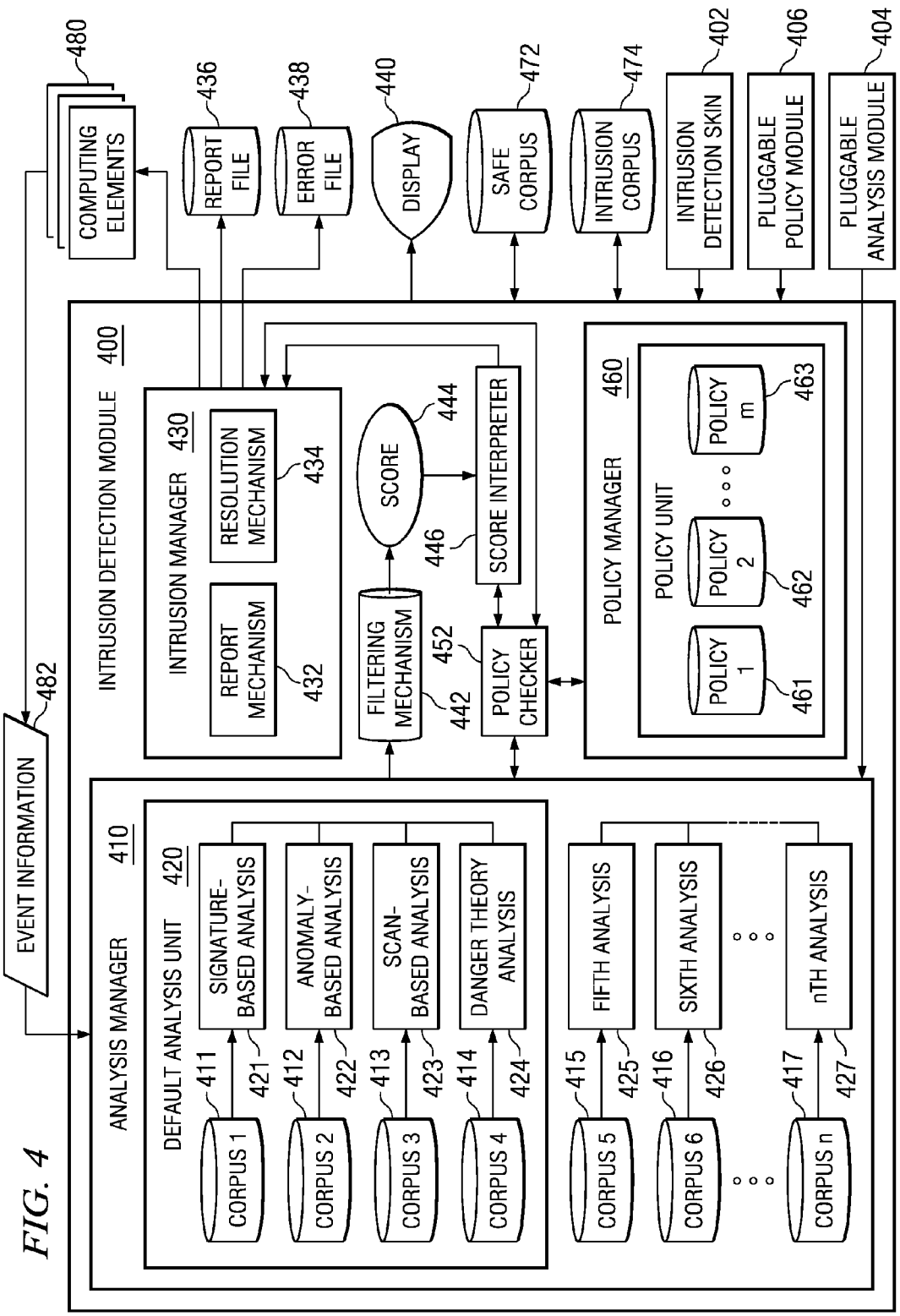
FIG. 4 is a block diagram of an intrusion detection module in accordance with exemplary aspects of the present invention.

FIG. 4 is a block diagram of an intrusion detection module in accordance with exemplary aspects of the present invention. Intrusion detection skin 402 is provided to intrusion detection module 400. Intrusion detection skin 402 allows an administrator to configure settings for intrusion detection module 400. For example, intrusion detection skin 402 may define the following:

which analysis approaches are to be managed and executed;

which filters are to be used to produce a score;

what score ratio/representation is to be produced to rate if an intrusion has occurred (e.g., a score can be an average over an x amount of time);

what weight each analysis approach has (i.e. how much the results from an approach affects the score);

assignment of rules on how weights for each analysis approach can be dynamically adjusted;

assignment of rules on how the score can be dynamically adjusted;

interval/frequency in which the analysis is to be executed;

look and feel of output to the display, error file, reports, etc.;

how to determine false positives and false negatives produced by the various approaches;

how detected intrusions are resolved (as well as what actions to be taken based on particular scores);

what approaches are to be executed (if desired, combinations of approaches can be specified for certain computing elements);

where to send reports and errors (e-mail, display, etc.);

step-by-step details of each analysis approach as it is executed;

what statistics/metrics to collect on intrusion activity (i.e. number of intrusions, causes of intrusions, how secure a computing environment is, and so forth).

Intrusion detection skin 402 may simply be provided as a text-based configuration file, although a person of ordinary skill in the art will recognize that intrusion detection skin 402 may also be provided as other data structures, such as extensible markup language (XML) files, databases, tables, and the like. Alternatively, intrusion detection module 400 may include or communicate with a graphical user interface (not shown) that may be used to create intrusion detection skin 402. For example, intrusion detection skin 402 may be created using a Web-based user interface (not shown).

Reports and errors may be presented on display 440, for example, or may be transmitted through a messaging delivery system (not shown), such as electronic mail, for example. Statistics or metrics may include the number of violations, the causes of violations, how secure a database server is, and so forth. Therefore, intrusion detection skin 402 allows the administrator to completely tailor the entire process of how databases are checked.

Intrusion detection module 400 includes analysis manager 410, which is pre-loaded with default analysis unit 420, including default analysis techniques that may be executed for intrusion detection. In accordance with a preferred embodiment of the present invention, an intrusion detection system is provided for performing intrusion decision-making using a plurality of approaches. Intrusion detection systems conventionally use one of several detection approaches. These approaches may include, for example, signature-based, anomaly-based, scan-based, and danger theory approaches.

A signature-based approach uses a predefined pattern to map to a known intrusion. Patterns usually lie within auditing events of a system, such as logs or records. Traditionally, these patterns are generated by a developer or system administrator to evaluate network traffic.

An anomaly-based approach uses a "baseline" in which complete knowledge of "self" or expected behavior is used to detect intrusions. Any deviations from this "baseline" of expected behavior is declared to be abnormal. The baseline may be gathered during a training or tuning phase. Traffic to and from a system or network may be gathered, analyzed, and stored.

Scan-based solutions search for suspicious scans that occur outside of a firewall to gain knowledge about various resources, such as what ports are available. Viruses, and in particular worms, seek to propagate by discovering vulnerabilities of other devices to which a device may be communicatively connected. A firewall may prevent many scan-based attacks if it is perfectly configured. However, a firewall is only as effective as the technician or administrator that configures it. Therefore, a scan-based intrusion system may identify pre-attack scanning or reconnaissance activity before a potential intrusion occurs, rather than waiting for the intrusion itself for detection.

A fairly recent intrusion detection approach being investigated is danger theory. In the danger theory approach, a system may react to foreign substances or activities based on various danger signals. Once a foreign substance enters a system, a danger response is activated. Upon a danger response, a danger zone is used to surround the foreign substance. Sensors are created in the danger zone and the sensors are notified if a danger signal indicates a strong possibility of a malicious attack.

The existing intrusion detection approaches have tradeoffs. For a signature-based approach, an attack may go unrecognized if the pattern for the attack is new, unknown, or undefined. One must know the characteristics of the intrusion for the signature-based approach to be effective. Numerous false positives can be produced because signatures for intrusions often resemble non-threatening occurrences. False positives can greatly hamper the effectiveness of a system.

For anomaly-based solutions, an accurate and complete set of normal behaviors must be determined for intrusion detection to be effective. No predefined signatures are needed. However, an anomaly-based intrusion detection approach is likely to identify abnormal but harmless and normal but harmful intrusions. There is also a good chance that intrusions can strike without being detected.

In scan-based approaches, no predefined signatures or complete knowledge of normal behaviors are needed. However, since scan-based solutions rely solely on scans, many intrusions may be undetected in the event that an attacker does not issue a scan to intrude a system. Attackers are quickly deriving new attack strategies; thus, complete reliance on one characteristic is very risky.

The danger theory approach may help alleviate the problem of "non-self but harmless" and "self but harmful" intrusions that may be missed by anomaly-based approaches. Danger theory may also address the fact that not all foreign activities will trigger a reaction. Discrimination between "self" and "non-self" may still be used in danger theory, but this discrimination is not required. The problem with the danger theory approach is that the exact nature of how to define a danger signal is unclear. Also, there may be some dangers that should not trigger a reaction.

Analysis manager 410 uses a plurality of approaches 421-424, such as, for example, the above approaches, to identify malicious activity. When event information is received, each approach produces a result. A consensus of each result is then reached by using, for example, Bayesian Filtering. Corpora 411-417 are kept for the plurality of approaches. Intrusion corpus 474 keeps combinations of the corpora for all of the approaches that constitute intrusions. Safe corpus 472 keeps combinations of the corpora for all of the approaches that do not constitute an intrusion. Corpora 411-417 for analysis approaches 421-427 may be pre-defined according to security policies and the like. Intrusion corpus 474 and safe corpus 472 may be trained using scores that are determined using the detection approaches.

In the depicted example, default analysis unit 420 includes signature-based analysis 421, anomaly-based analysis 422, scan-based analysis 423, and danger theory analysis 424, as well as corresponding corpora 411-414. Pluggable analysis module 404 allows an administrator to add analysis approaches, such as fifth analysis 425, sixth analysis 426, to nth analysis 427, along with corresponding corpora 415-417, to analysis manager 410.

Thus, the administrator may use pluggable analysis module 404 to supplement analysis module 410 with additional analysis approaches on the fly. The administrator or other developer may program the additional analysis approaches 425-427 in any programming language as long as they conform to an application programming interface (API) of pluggable analysis module 404. This is useful as security policies evolve with new or updated analysis approaches. Any number of analysis approaches may be added to analysis module 410 via pluggable module 404.

Computing elements 480 generate event information 482. Computing elements 480 may be software programs running on a particular machine, a hardware firewall or software firewall, or other devices in a network, such as network data processing system 100 in FIG. 1. Analysis manager 410 runs the analysis approaches against event information 482. Analysis manager 410 sends analysis results to filtering mechanism 442, which generates score 444. Score interpreter 446 then interprets score 444 and sends the results to intrusion manager 430.

Each analysis approach may be assigned a weight via intrusion detection skin 402. Of the approaches that the administrator indicates are to be executed, analysis manager 410 ensures that the assigned weights total 100%. Analysis manager 410 also interfaces with policy checker 452 to ensure no security policies are violated by any of the analysis approaches. If policy checker 452 rejects an analysis approach, analysis manager 410 notifies the administrator and prohibits the analysis approach from being included as part of the intrusion detection process. No analysis approaches are executed unless approved by policy checker 452.

Policy checker 452 checks policies from policy manager 460 and applies the policies to analysis manager 410. Policy manager 460 includes a policy unit that manages policy 1 to policy m 461-463. The policy unit consists of the policies 461-463 that are to be followed by intrusion detection module 400. An administrator may add, modify, remove, or configure policies 461-463 using pluggable policy module 406 on the fly.

Policy manager 460 may be preloaded with security policies that always need to be followed for distributed or autonomic computing elements. Policy manager 460 also manages any policies within the policy unit. For example, if a policy expires, policy manager 460 removes the policy from the policy unit. Policy checker 452 ensures that requirements from the expired policy are no longer enforced. Policy manager 460 inserts policies into the policy unit from pluggable policy module 406. Policy manager 460 also can alert the administrator to assign priorities to policies/requirements via intrusion detection skin 402 when it detects that two or more security policies have varying requirements for the same item, for example. Thresholds for a score can be set based on a security policy.

Policy checker 452 enforces security policies 461-463 managed by policy manager 460. No activity can be executed by analysis manager 410, filtering mechanism 442, score interpreter 446, or intrusion manager 430 without receiving approval from policy checker 452. Policy checker 452 also reports any errors that occur during execution to intrusion manager 430.

Intrusion manager 430 comprises reporting mechanism 432 and resolution mechanism 434. Reporting mechanism 432 controls how reporting of intrusions is handled. Resolution mechanism 434 controls how resolutions to those intrusions are handled. Intrusion manager 430 sends data to be reported to report file 436 and sends any errors that occur during execution to error file 438. Reports may also be made to display 440, which may be a terminal display or a remote device. Report mechanism 432 may send intrusion information via a messaging system (not shown), such as electronic mail (e-mail) or the like. For example, report mechanism 432 may send report message indicating discovered security violations to the administrator's mobile telephone device, PDA, text pager, or the like.

The administrator may configure report mechanism 432 to report additional information like security checks that pass, as well as background information of the security policy from which each check originated, how to resolve the violations, etc. Thus, report mechanism 432 provides concrete evidence of how secure one or more distributed or autonomic computing elements are.

Resolution mechanism 434 determines how intrusions may be resolved. The administrator may use intrusion detection skin 402 to instruct resolution mechanism 434 as to which intrusions are to be automatically resolved and how the intrusions are to be resolved. For example, if a score is produced that identifies an infected computing element, the responsibilities of that element may be delegated to another computing element while the infection is removed. Once the infection is removed, the once-infected computing element may resume its operations. If resolution mechanism 434 is unable to resolve the violation, it may immediately contact the administrator and make recommendations to the administrator on how to resolve the violation, for example. This is a configurable feature.

Furthermore, data produced from analysis manager 410 is filtered by filtering mechanism 442 to produce a score; these scores are identified as being safe or an intrusion. Intrusion detection module 400 identifies and keeps track of false positives and false negatives. As false positives and false negatives are identified, the weights used by analysis manager 410 are adjusted dynamically. These weights may be adjusted automatically, as defined by intrusion detection skin 402 and policy manager 460. Weights may also be adjusted manually by the administrator by modifying the weight information in intrusion detection skin 402.

The administrator assigns weights initially based on what he or she believes (human expert input) will accurately cover the rates of false positives and false negatives that may occur within a given environment. Intrusion detection module 400 applies these weights and adjusts the weights to be more accurate after analyzing actual data obtained from execution in a given environment. In other words, intrusion detection module 400 adapts to the computing environment.

Intrusion detection module 400 may be embodied on one or more devices within network data processing system 100. In an autonomic computing environment, each device may be self-securing. In other words, each device in network data processing system 100 may include the intrusion detection mechanism of the present invention. Note that components of intrusion detection module 400 may be distributed across networks and still work together to complete intrusion detection analysis as described. For example, the components of intrusion detection module 400 may be on different systems. Other modifications to intrusion detection module 400 may be made depending on the implementation.

Figure 5B:
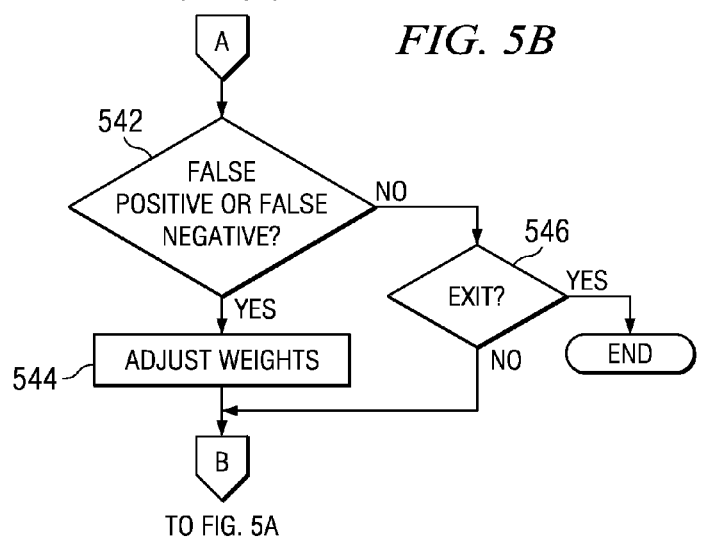
FIGS. 5A and 5B depict a flowchart illustrating the operation of an intrusion decision module in accordance with exemplary aspects of the present invention.
Figure 5A:
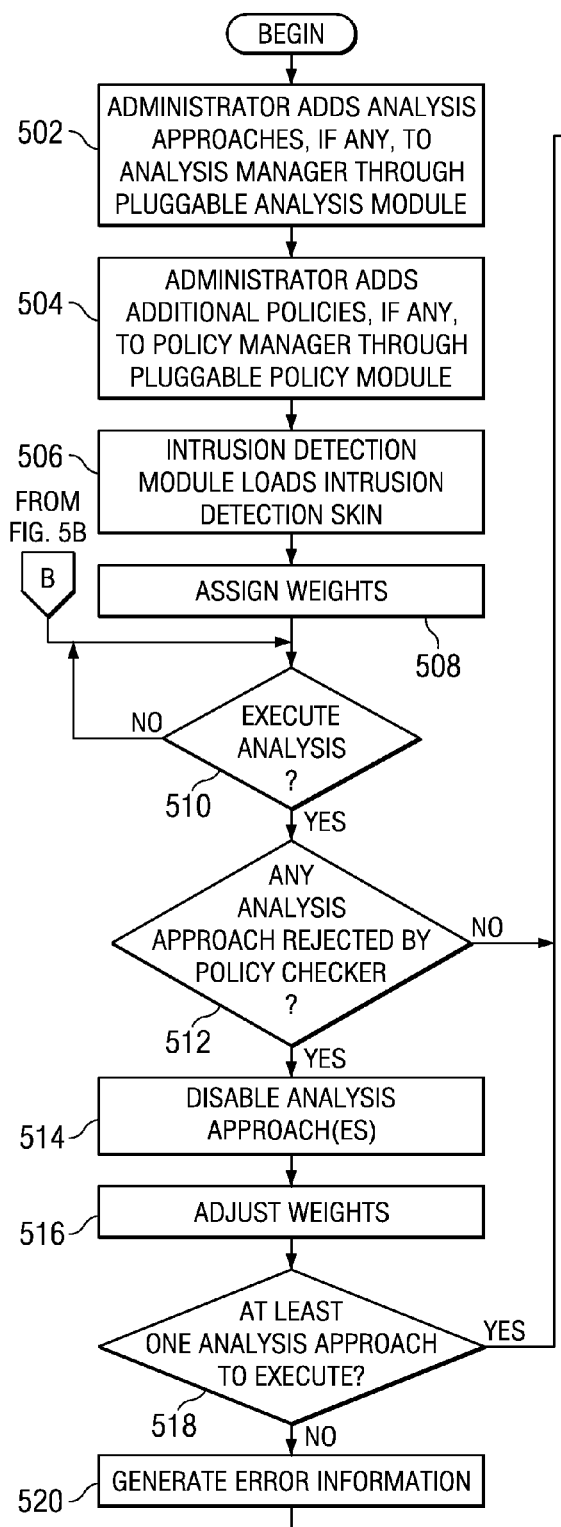
Figure 5A:
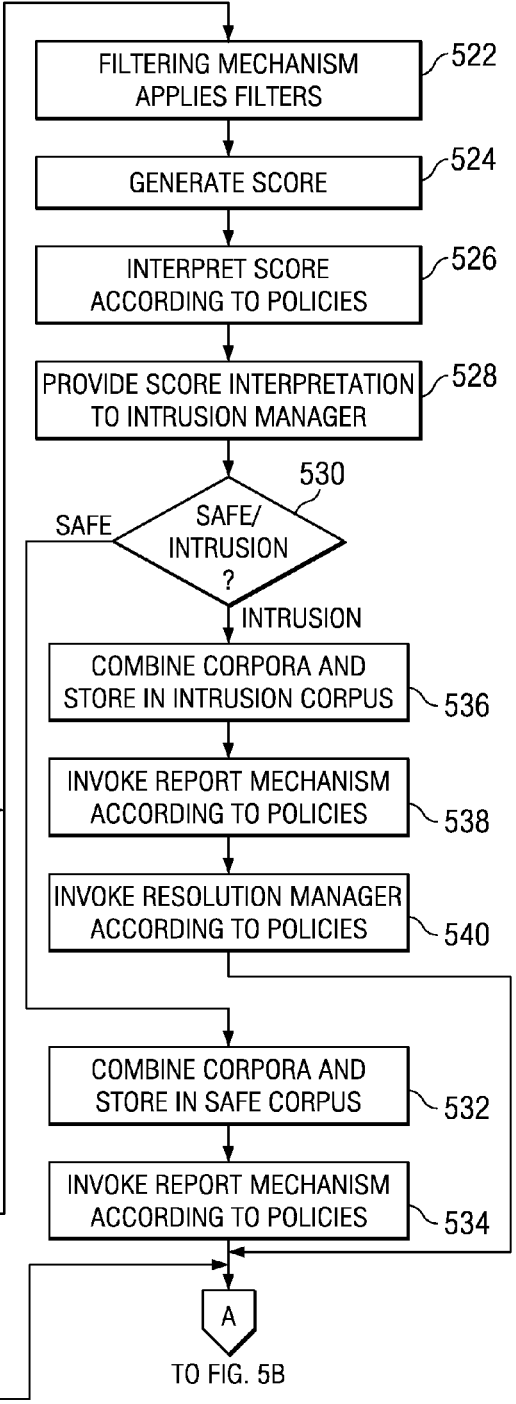

FIGS. 5A and 5B depict a flowchart illustrating the operation of an intrusion decision module in accordance with exemplary aspects of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory, storage medium, or transmission medium that can direct a processor or other programmable data processing apparatus to function in a particular manner, such that the instructions stored in the computer-readable memory, storage medium, or transmission medium produce an article of manufacture including instruction means which implement the functions specified in the flowchart block or blocks.

Accordingly, blocks of the flowchart illustrations support combinations of means for performing the specified functions, combinations of steps for performing the specified functions and computer usable program code for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With reference now to FIG. 5A, operation begins and the administrator adds additional analysis approaches, if any, to the analysis manager through a pluggable analysis module (block 502). The administrator then adds additional policies, if any, to the policy manager through a pluggable policy module (block 504). The intrusion detection module loads an intrusion detection skin (block 506) and assigns weights to the analysis approaches (block 508).

Next, the analysis manager determines whether to execute analysis (block 510). The analysis may execute the analysis approaches periodically based on an interval or schedule defined in the intrusion detection skin. Alternatively, an administrator may manually instruct the analysis manager to execute the analysis approaches. If the analysis manager determines not to execute analysis, block 510 repeats.

If the analysis manager determines to execute analysis in block 510, the analysis manager determines whether any analysis approaches are rejected by the policy checker (block 512). If any analysis approaches are rejected, the analysis manager disables the rejected approaches (block 514) and adjusts weights (block 516). Thereafter, the analysis manager determines whether at least one approach is to execute (block 518). If all approaches are rejected by the policy checker, the policy checker generates error information (block 520) and operation proceeds to block 542 in FIG. 5B described below.

If the analysis manager determines that at least one analysis approach is to be executed in block 518, the filtering mechanism applies filters according to the intrusion detection skin and policies (block 522) and the intrusion detection module generates a score (block 524). The intrusion detection module then interprets the score according to the policies (block 526) and provides the score interpretation to the intrusion manager (block 528).

The intrusion detection module determines whether the score indicates a safe event or an intrusion (block 530). If the intrusion detection module detects a safe event, the intrusion detection module combines the corpora of the analysis approaches (block 532) and invokes the report mechanism according to the policies (block 534). Thereafter, operation proceeds to block 542 in FIG. 5B described below.

If the intrusion detection module detects an intrusion in block 530, the intrusion detection module combines the corpora of the analysis approaches (block 536). The intrusion detection module then invokes the report mechanism according to the policies (block 538) and invokes the resolution mechanism according to the policies (block 540). Thereafter, operation proceeds to block 542 in FIG. 5B.

Turning to FIG. 5B, in block 542 the intrusion detection module determines whether a false positive or a false negative is identified (block 542). If a false positive or false negative is identified, the analysis manager adjusts the weights (block 544) and operation returns to block 510 in FIG. 5A to determine whether to execute analysis. If the intrusion detection module does not determine that a false positive or false negative is identified in block 542, then the intrusion detection mechanism determines whether an exit condition exists (block 546). An exit condition may exist, for example, if the intrusion detection module is terminated or if the intrusion detection skin is configured to only run a single set of analysis approaches. If an exit condition does not exist, then operation returns to block 510 of FIG. 5A; otherwise, if an exit condition exists in block 546, operation ends.

While in the example shown in FIG. 5B, the analysis manager adjusts weights responsive to a single false positive or false negative, the analysis manager may alternatively adjust the weights of the intrusion analysis modules if a certain number of false positives or false negatives occur. For example, the signature-based analysis approach may be given a substantial weight by the administrator initially, but then produce a large number of false positives when executed in a particular environment. In this case, the analysis manager may decrease the weight of the signature-based analysis approach to more accurately represent the rate of false positives that occurred.

Also, a time threshold of when to automatically adjust the weights may be set in the intrusion detection skin. This may cause the analysis manager to collect one week of data, for example, and then adjust the weights of the analysis approaches accordingly.

Thus, the present invention solves the disadvantages of the prior art by providing an intrusion detection mechanism for flexible, automatic, thorough, and consistent security checking and vulnerability resolution in a heterogeneous environment. The mechanism may provide a predefined number of default intrusion analysis approaches, such as signature-based, anomaly-based, scan-based, and danger theory. The intrusion detection mechanism also allows a limitless number of intrusion analysis approaches to be added on the fly. Using an intrusion detection skin, the mechanism allows various weights to be assigned to specific intrusion analysis approaches. The mechanism may adjust these weights dynamically. The score ration can be tailored to determine if an intrusion occurred and adjusted dynamically. Also, multiple security policies for any type of computing element may be enforced.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for intrusion detection in a computer environment, the computer implemented method comprising:
   receiving first configuration information from an intrusion detection skin, wherein the first configuration information identifies a set of one or more analysis approaches to be executed and a weight to apply to each of the one or more analysis approaches;
   executing the set of one or more analysis approaches against event information generated by one or more computing elements in the computer environment;
   determining a score based on one or more policies; and
   determining whether the event information represents an intrusion based on the score.

2. The computer implemented method of claim 1, wherein the intrusion detection skin defines at least one of:
   which filters are to be used to produce the score;
   what score ratio is to be produced to rate if an intrusion has occurred;
   assignment of rules on how weights for each analysis approach are to be dynamically adjusted;
   assignment of rules on how the score is to be dynamically adjusted;
   interval/frequency in which the set of one or more analysis approaches is to be executed;

look and feel of output;

how to determine false positives and false negatives produced by the set of one or more analysis approaches;

how detected intrusions are resolved;

where to send reports and errors; or what statistics/metrics to collect on intrusion activity.

3. The computer implemented method of claim 1, wherein the set of one or more analysis approaches comprises one or more default analysis approaches.

4. The computer implemented method of claim 3, wherein the one or more default analysis approaches comprises at least one of a signature-based analysis approach, an anomaly-based analysis approach, a scan-based analysis approach, or a danger theory analysis approach.

5. The computer implemented method of claim 3, wherein the set of one or more analysis approaches comprises at least one analysis approach added through a pluggable analysis module.

6. The computer implemented method of claim 1, further comprising:
responsive to a determination that the event information represents an intrusion based on the score, determining whether the determination is a false positive.

7. The computer implemented method of claim 6, further comprising:
responsive to a predetermined number of false positives, adjusting the weight to apply to each of the one or more analysis approaches.

8. The computer implemented method of claim 1, further comprising:
responsive to a determination that the event information does not represent an intrusion based on the score, determining whether the determination is a false negative.

9. The computer implemented method of claim 8, further comprising:
responsive to a predetermined number of false negatives, adjusting the weight to apply to each of the one or more analysis approaches.

10. The computer implemented method of claim 1, further comprising:
responsive to a determination that the event information represents an intrusion based on the score, notifying an administrator of the intrusion according to the one or more policies.

11. The computer implemented method of claim 1, further comprising:
responsive to a determination that the event information represents an intrusion based on the score, resolving the intrusion according to the one or more policies.

12. An intrusion detection system, comprising:
an analysis module that receives first configuration information from an intrusion detection skin, wherein the first configuration information identifies a set of one or more analysis approaches to be executed and a weight to apply to each of the one or more analysis approaches, and executes the set of one or more analysis approaches against event information generated by one or more computing elements in a computer environment;
a filtering mechanism that determines a score based on one or more policies; and
a score interpreter that determines whether the event information represents an intrusion based on the score.

13. The intrusion detection system of claim 12, further comprising:
a pluggable analysis module configured to allow an administrator to add at least one analysis approach to the set of one or more analysis approaches.

14. The intrusion detection system of claim 12, further comprising:
an intrusion manager that notifies an administrator of the intrusion according to the one or more policies responsive to a determination that the event information represents an intrusion based on the score.

15. The intrusion detection system of claim 12, further comprising:
an intrusion manager that resolves the intrusion according to the one or more policies responsive to a determination that the event information represents an intrusion based on the score.

16. A computer program product for intrusion detection in a computer environment, the computer program product comprising:
a computer usable storage medium having computer readable program code embodied therein;
computer usable program code configured to receive first configuration information from an intrusion detection skin, wherein the first configuration information identifies a set of one or more analysis approaches to be executed and a weight to apply to each of the one or more analysis approaches;
computer usable program code configured to execute the set of one or more analysis approaches against event information generated by one or more computing elements in the computer environment;
computer usable program code configured to determine a score based on one or more policies; and
computer usable program code configured to determine whether the event information represents an intrusion based on the score.

17. The computer program product of claim 16, wherein the set of one or more analysis approaches comprises one or more default analysis approaches and wherein the one or more default analysis approaches comprises at least one of a signature-based analysis approach, an anomaly-based analysis approach, a scan-based analysis approach, or a danger theory analysis approach.

18. The computer program product of claim 16, further comprising:
computer usable program code configured to adjust the weight to apply to each of the one or more analysis approaches responsive to a predetermined number of false positives or a predetermined number of false negatives.

19. The computer program product of claim 16, further comprising:
computer usable program code configured to notify an administrator of the intrusion according to the one or more policies responsive to a determination that the event information represents an intrusion based on the score.

20. The computer program product of claim 16, further comprising:
computer usable program code configured to resolve the intrusion according to the one or more policies responsive to a determination that the event information represents an intrusion based on the score.

* * * * *